US009111403B2

(12) United States Patent
Westerlage

(10) Patent No.: US 9,111,403 B2
(45) Date of Patent: Aug. 18, 2015

(54) SYSTEMS AND METHODS FOR TRACKING DEVICE CONTROL AND REPORT

(75) Inventor: Kenneth R. Westerlage, Fort Worth, TX (US)

(73) Assignee: On-Board Communications, Inc., Dallas, TX (US)

( * ) Notice: Subject to any disclaimer, the term of this patent is extended or adjusted under 35 U.S.C. 154(b) by 806 days.

(21) Appl. No.: 12/949,856

(22) Filed: Nov. 19, 2010

(65) Prior Publication Data

US 2012/0130636 A1 May 24, 2012

(51) Int. Cl.

| | |
|---|---|
| ***G01C 21/00*** | (2006.01) |
| ***G07C 5/00*** | (2006.01) |
| ***G07C 5/02*** | (2006.01) |
| ***G08G 1/00*** | (2006.01) |

(52) U.S. Cl.

CPC *G07C 5/008* (2013.01); *G07C 5/02* (2013.01); *G08G 1/20* (2013.01); *G01C 21/00* (2013.01)

(58) Field of Classification Search

CPC .......................................................... G01C 21/00
USPC ............................................................ 701/408
See application file for complete search history.

(56) References Cited

U.S. PATENT DOCUMENTS

| | | | | |
|---|---|---|---|---|
| 5,046,007 | A | 9/1991 | McCrery et al. | 364/424.04 |
| 5,267,159 | A | 11/1993 | O'Neall | 364/424.04 |
| 5,471,393 | A * | 11/1995 | Bolger | 701/446 |
| 5,541,858 | A | 7/1996 | Warner | 364/561 |
| 5,987,375 | A * | 11/1999 | Tamai | 701/400 |
| 6,088,636 | A | 7/2000 | Chigumira et al. | 701/26 |
| 6,088,650 | A * | 7/2000 | Schipper et al. | 701/521 |
| 6,115,655 | A * | 9/2000 | Keith et al. | 701/467 |
| 6,301,533 | B1 * | 10/2001 | Markow | 701/32.4 |
| 6,353,796 | B1 * | 3/2002 | Schipper et al. | 701/518 |
| 6,393,346 | B1 * | 5/2002 | Keith et al. | 701/521 |
| 6,408,232 | B1 | 6/2002 | Cannon et al. | 701/29 |
| 6,502,020 | B2 | 12/2002 | Lang | 701/29 |

(Continued)

FOREIGN PATENT DOCUMENTS

WO WO 2008/065639 6/2008

OTHER PUBLICATIONS

*Javatek Media; trackIT: Vehicle Edition; User Manual*; 11 pages.

(Continued)

*Primary Examiner* — Khoi Tran
*Assistant Examiner* — Harry Oh
(74) *Attorney, Agent, or Firm* — Baker Botts L.L.P.

(57) ABSTRACT

Systems and methods for systems and method for tracking device control and reporting are disclosed. In one embodiment, a method includes receiving first location information from a vehicle tracking device associated with a vehicle, the first location information indicating a location of a vehicle at a first location. The method also includes receiving second location information from the vehicle tracking device, the second location information indicating a location of the vehicle at a second location and a distance traveled by the vehicle from the first location. The method further includes determining based on the second location information, an actual distance traveled by the vehicle from the first location to the second location. The method also includes determining, based on the first location information and the second location information, an expected distance between the first location and the second location and comparing the actual distance traveled by the vehicle to the expected distance.

24 Claims, 7 Drawing Sheets

(56) References Cited

U.S. PATENT DOCUMENTS

| | | | | |
|---|---|---|---|---|
| 6,741,933 | B1 * | 5/2004 | Glass | 701/454 |
| 6,778,900 | B2 | 8/2004 | Tengler et al. | 701/201 |
| 7,197,394 | B2 | 3/2007 | Ohler | 701/209 |
| 7,305,245 | B2 | 12/2007 | Alizadeh-Shabdiz et al. | 455/456.6 |
| 7,340,332 | B2 | 3/2008 | Underdahl et al. | 701/35 |
| 7,522,069 | B2 | 4/2009 | Tunnell et al. | 340/995.19 |
| 7,555,378 | B2 | 6/2009 | Larschan et al. | 701/35 |
| 7,599,770 | B2 | 10/2009 | Hardy | 701/35 |
| 7,660,652 | B2 | 2/2010 | Smith et al. | 701/35 |
| 8,346,477 | B2 * | 1/2013 | Harding | 701/426 |
| 2006/0200286 | A1 * | 9/2006 | Kumagai et al. | 701/35 |
| 2007/0027621 | A1 * | 2/2007 | Operowsky et al. | 701/210 |
| 2007/0150137 | A1 | 6/2007 | Graham | 701/35 |
| 2007/0150139 | A1 | 6/2007 | Hardy | |
| 2007/0208503 | A1 | 9/2007 | Harnsberger | 701/208 |
| 2007/0250258 | A1 * | 10/2007 | Hager | 701/201 |
| 2008/0030376 | A1 | 2/2008 | Tunnell et al. | |
| 2009/0292418 | A1 | 11/2009 | Kuykendal | 701/35 |
| 2010/0063904 | A1 | 3/2010 | Ronen et al. | 705/30 |

OTHER PUBLICATIONS

PCT Notification of Transmittal of the International Search Report and the Written Opinion of the International Searching Authority; or the Declaration with attached PCT International Search Report and Written Opinion of the International Searching Authority dated Jan. 16, 2012, 14 pages.

* cited by examiner

SYSTEMS AND METHODS FOR TRACKING DEVICE CONTROL AND REPORT

TECHNICAL FIELD OF THE INVENTION

The present disclosure relates generally to vehicle tracking, and more particularly to systems and methods for tracking device control and reporting.

BACKGROUND OF THE INVENTION

In some organizations, employees use a company car to conduct business. In other organizations, personnel are reimbursed for certain expenses incurred for travel on business. However, organizations lack a reliable way to track a vehicle and verify a self-reported expense amount. Moreover, activating and deactivating vehicle tracking without reliance on the employee is problematic.

SUMMARY OF THE INVENTION

In accordance with teachings of the present disclosure, systems and methods for tracking control and reporting are disclosed.

In one embodiment, a method includes receiving first location information from a vehicle tracking device associated with a vehicle, the first location information indicating a location of a vehicle at a first location. The method also includes receiving second location information from the vehicle tracking device, the second location information indicating a location of the vehicle at a second location and a distance traveled by the vehicle from the first location. The method further includes determining based on the second location information, an actual distance traveled by the vehicle from the first location to the second location. Additionally, the method includes determining, based on the first location information and the second location information, an expected distance between the first location and the second location.

In another embodiment, a method includes storing a plurality of location information, each of the location information associated with a location. The method also includes, for each of the stored plurality of location information, storing a category identifier associated with the respective location information. Additionally, the method includes receiving first location information from a vehicle tracking device associated with a vehicle, the first location information indicating a location of a vehicle at a first location. The method further includes receiving second location information from the vehicle tracking device, the second location information indicating a location of the vehicle at a second location. The method further includes receiving third location information from the vehicle tracking device, the third location information indicating a location of the vehicle at a third location. Additionally, the method includes comparing the first location information, the second location information, and the third location information to the stored plurality of location information and based on the comparison, determining a category identifier associated with each of the first location information, the second location information, and the third location information.

In yet another embodiment, a system includes a vehicle tracking device operable to transmit first location information indicating at least a location of a vehicle at a first location. The vehicle tracking device is also operable to transmit second location information indicating at least a location of a vehicle at a second location. The system also includes a processor operable to receive the first location information and the second location information and determine, based on the second location information, an actual distance traveled by the vehicle from the first location to the second location. The processor is also operable to determine, based on the first location information and the second location information, an expected distance between the first location and the second location.

In yet another embodiment, a system includes a memory operable to store a plurality of location information, each of the location information associated with a location and, for each of the stored plurality of location information, store a category identifier associated with the respective location information. The system also includes a tracking device operable to transmit first location information from a vehicle tracking device associated with a vehicle, the first location information indicating a location of a vehicle at a first location. The tracking device is also operable to transmit second location information from the vehicle tracking device, the second location information indicating a location of the vehicle at a second location. The tracking device is also operable to transmit third location information from the vehicle tracking device, the third location information indicating a location of the vehicle at a third location. The system also includes a processor operable to receive the first location information, the second location information, and the second location information from the vehicle tracking device. The processor is also operable to compare the first location information, the second location information, and the third location information to the stored plurality of location information and, based on the comparison, determine a category identifier associated with each of the first location, the second location information, and the third location information.

In yet another embodiment, a system includes a memory operable to store a plurality of location information, each of the location information associated with a location and for each of the stored plurality of location information, store a category identifier associated with the respective location information. The system also includes a tracking device operable to transmit first location information from a vehicle tracking device associated with a vehicle, the first location information indicating a location of a vehicle at a first location. The tracking device is further operable to transmit second location information from the vehicle tracking device, the second location information indicating a location of the vehicle at a second location. The tracking device is also operable to transmit third location information from the vehicle tracking device, the third location information indicating a location of the vehicle at a third location. The system also includes a processor operable to receive the first location information, the second location information, and the second location information from the vehicle tracking device and compare the first location information, the second location information, and the third location information to the stored plurality of location information. The processor is also operable to, based on the comparison, determine a category identifier associated with each of the first location, the second location information, and the third location information.

In yet another embodiment, a non-transitory computer-readable storage medium is encoded with logic, and the logic is operable, when executed on a processor to receive first location information from a vehicle tracking device associated with a vehicle, the first location information indicating a location of a vehicle at a first location. The logic is also operable to receive second location information from the vehicle tracking device, the second location information indicating a location of the vehicle at a second location and a distance traveled by the vehicle from the first location. The logic is also operable to determine, based on the second location information, an actual distance traveled by the vehicle from the first location to the second location. The logic is also operable to determine, based on the first location information and the second location information, an expected distance between the first location and the second location.

In yet another embodiment, a non-transitory computer-readable storage medium is encoded with logic, and the logic is operable, when executed on a processor to store a plurality of location information, each of the location information associated with a location. The logic is further operable to, for each of the stored plurality of location information, store a category identifier associated with the respective location information. The logic is also operable to receive first location information from a vehicle tracking device associated with a vehicle, the first location information indicating a location of a vehicle at a first location. The logic is also operable to receive second location information from the vehicle tracking device, the second location information indicating a location of the vehicle at a second location. The logic is also operable to receive third location information from the vehicle tracking device, the third location information indicating a location of the vehicle at a third location. Additionally, the logic is operable to compare the first location information, the second location information, and the third location information to the stored plurality of location information and, based on the comparison, determine a category identifier associated with each of the first location, the second location information, and the third location information.

Technical advantages of particular embodiments may include enabling operators of a vehicle tracking system to determine a particular use for which a vehicle is being utilized. For example, a vehicle tracking system may be able to track a vehicle to determine whether the vehicle is being used for business or personal reasons or a combination of business and personal reasons. In some embodiments, a vehicle tracking system may enable an operator to determine a compensation amount for a distance traveled for business purposes. For example, based on a determination of a distance traveled for personal reasons and a distance traveled for business reasons, operators may reimburse an appropriate amount of travel and/or mileage expenses to a driver/employee. Operators may also be able to verify and/or correct a travel expense reimbursement request submitted by a driver/employee. A vehicle tracking system may also enable operators to monitor a vehicle's usage, store a maintenance schedule associated with a vehicle, and alert an operator of a vehicle tracking system when scheduled maintenance is due.

Other technical advantages will be readily apparent to one of ordinary skill in the art from the following figures, descriptions, and claims. Moreover, while some specific advantages have been enumerated above, various embodiments may include all, some, or none of the enumerated advantages.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF THE INVENTION

Figure 1A:
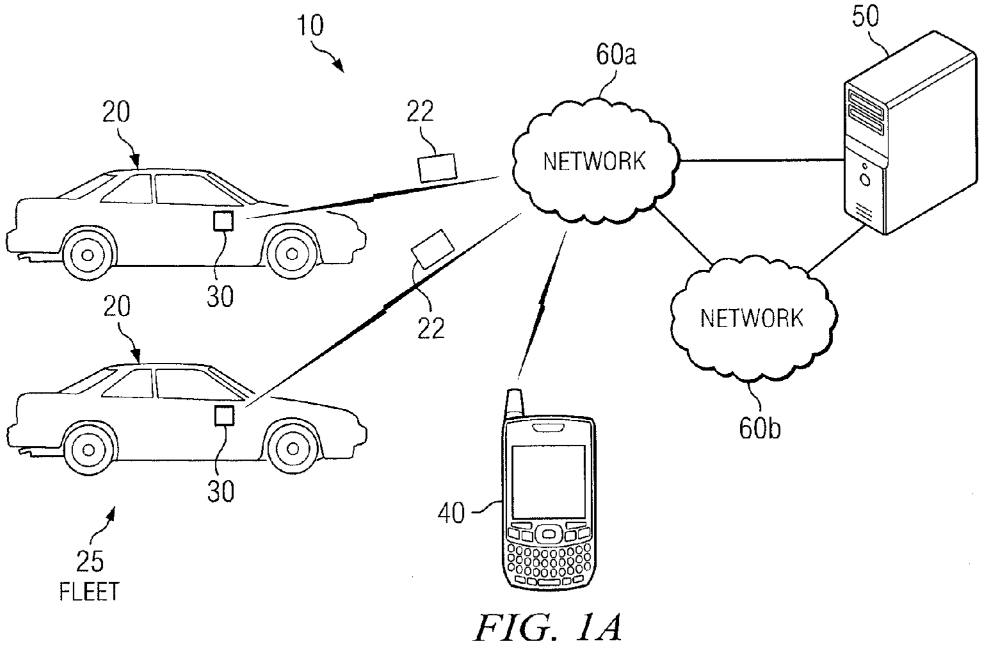
FIGS. 1A and 1B illustrate a vehicle tracking system including a backend controller, a vehicle tracking device, a control device, and a network, in accordance with particular embodiments of the present disclosure.

Various embodiments and their advantages may be understood by referring to FIGS. 1-7 of the drawings. FIG. 1A illustrates a vehicle tracking system 10 in accordance with particular embodiments of the present disclosure. As shown in FIG. 1A, vehicle tracking system 10 includes vehicle 20, tracking device 30, control device 40, backend control 50, and networks 60*a* and 60*b*. Vehicle tracking system 10 activates and/or deactivates tracking device 30 located in or on vehicle 20 in order to track positions and movements of vehicle 20. In some embodiments, tracking device 30 transmits signals indicative of the position and/or movement of vehicle 20 to backend controller 50. FIG. 1B illustrates that position and/or movement of vehicle 20 may be associated with a trip 12 comprised of one or more trip segments 14. Trip segments 14 may be defined by one or more stop locations 16. Based on the transmitted signals and/or previously collected positional and/or movement-based information, backend controller 50 may be able to determine a category of trip 12, trip segment 14, and/or stop location 16. A category of trip 12, trip segment 14, and/or stop location 16 may include, but is not limited to, business and personal. In certain embodiments, backend controller 50 may generate one or more reports that provide information about vehicle movement associated with the movement of one or more vehicles 20. In accordance with particular embodiments of the present disclosure, components of vehicle tracking system 10 are described in more detail below.

Vehicle 20 represents any passenger or commercial vehicle able to travel on roads and/or rail. For example, vehicle 20 may represent a two-axle passenger vehicle. Vehicle 20 may also represent a two to six axle commercial vehicle. In certain embodiments, vehicle 20 represents rail cars and/or other rolling stock. In some embodiments, vehicle 20 represents a vehicle owned by an employee or contractor of an employer or other organization. Vehicle 20 may also represent a vehicle owned by an employer or other organization that is driven by an employee and/or other personnel. In particular embodiments, backend controller 50 may associate one or more vehicles 20 into a fleet 25. Fleet 25 represents a group of vehicles 20 for which positional and/or movement information is collected and/or analyzed.

Tracking device 30 is disposed or located on vehicle 20 and determines one or more positions and/or the movement of vehicle 20. Tracking device 30 includes relevant hardware and/or software for determining a position and/or the movement of vehicle 20. In some embodiments, tracking device 30 represents a device comprising relevant hardware and/or software included within an enclosure. In some embodiments, tracking device 30 is located in the passenger compartment of a vehicle, enabling access by a user of vehicle 20. Tracking device 30 may also be suitably located in a trunk, attached to an under-carriage of vehicle 20, or in any other location in or on vehicle 20. Tracking device 30 may also include a user interface. In some embodiments, a user interface may enable a user to activate or deactivate tracking device 30. For example, tracking device 30 may include an on-off switch that toggles tracking device 30 between an activated and deactivated mode. Particular embodiments may also include a switch to indicate the nature of a particular trip or segment of a trip undertaken by vehicle 20, such as, for example, a business or personal trip. In certain embodiments, tracking device 30 includes a Global Positioning System (GPS) receiver and associated components able to provide a position, velocity, and/or direction of vehicle 20 to other components of vehicle tracking system 10. Tracking device 30 may communicate with other components of vehicle tracking system 10 via networks 60*a* and/or 60*b*. In some embodiments, tracking device 30 includes appropriate hardware and/or software to communicate over a cellular network, an Internet Protocol based network and/or the Internet.

Control device 40 represents any electronic device operable to communicate, directly or indirectly, with tracking device 30 to send and/or receive information from tracking device 30. For example, control device 40 may represent, but is not limited to, a laptop computer, a desktop computer, a portable data assistant (PDAs), a cell phone, a smart phone, and/or a portable media player. In some embodiments, control device 40 comprises general-purpose personal computer (PC), a Macintosh, a workstation, a Unix-based computer, a server computer, or any suitable processing device. Additionally, in particular embodiments, control device 40 may include one or more processors operable to execute computer logic and/or software encoded on tangible media that performs the described functionality. Control device 40 may also include one or more input devices, such as a keyboard, trackball, or a mouse, tactile interface screens, and/or one or more graphical user interfaces (GUIs), through which a user may interact with the logic executing on the processor of control device 40. In general, however, control device 40 may include any appropriate combination of hardware, software, and/or encoded logic suitable to perform the described functionality. Additionally, control device 40 may be connected to or communicate with tracking device 30 and/or backend controller 50 directly or indirectly over networks 60*a* and/or 60*b*. Control device 40 may couple to networks 60*a* and/or 60*b* through a dedicated wired or wireless connection, or may connect to networks 60*a* and/or 60*b* only as needed to connect to and/or communicate with tracking device 30. For example, to activate vehicle tracking device 30 on vehicle 20, control device 40 may transmit a Simple Message Service (SMS) message to tracking device 30 through network 60*a*. In some embodiments, control device 40 the operations performed by backend controller 50 and/or tracking device 30 may be performed by control device 40. For example, control device 40 may determine positions and/or movements of vehicle 20 and determine and/or analyze positional and/or movement-based information associated with vehicle 20. Although FIG. 1A illustrates, for purposes of example, a single control device 40, alternative embodiments of system 10 may include any appropriate number and type of control devices 40.

Backend controller 50 represents any electronic device operable to determine and/or analyze positional and/or movement-based information associated with vehicle 20, and generate one or more reports associated with the positional and/or movement-based information. In some embodiments, backend controller 50 represents a general-purpose PC, a Macintosh, a workstation, a Unix-based computer, a server computer, and/or any suitable processing device. Although FIG. 1A illustrates, for purposes of example, a single backend controller 50, alternative embodiments of vehicle tracking system 10 may include any appropriate number and type of backend controllers 50. Additionally or alternatively, in some embodiments, the functions and operations described above may be cooperatively performed by one or more backend controllers 50.

Networks 60*a* and 60*b* represent wireline and/or wireless networks suitable for data transmission. Tracking device 30, control device 40, and backend controller 50 may each be communicatively coupled to one or more other components of vehicle tracking system 10 by network 60*a* and/or network 60*b*. In particular embodiments, control device 40 may communicatively couple to backend controller 50 and/or tracker device 30 via network 60*a*. Networks 60*a* and 60*b* may, for example, communicate analog or digital cellular telephony signals, General Packet Radio Service (GPRS) packets, Internet Protocol packets, frame relay frames, asynchronous transfer mode cells, and/or other suitable information between network addresses. Networks 60*a* and 60*b* may include one or more intranets, local area networks, metropolitan area networks, wide area networks, cellular networks, all or a portion of the Internet, and/or any other communication system or systems at one or more locations. In particular embodiments, control device 40 may communicate with tracking device 30 via network 60*a*, and communicate with backend controller 50 via network 60*b*. Similarly, backend controller 50 may communicate with tracking device 30 via network 60*a* and communicate with control device 40 via network 60*b*. For example, in particular embodiments, network 60*a* represents a cellular telephone network and network 60*b* represents the Internet. In such embodiments, backend controller 50 may communicate with tracking device 30 via a public or private Access Point Name (APN) interface to network 60*a*, and communicate with control device 40 via an interface to an Internet Service Provider (ISP). The respective components of vehicle tracking system 10, however, may communicate with other components via any suitable network 60 in any arrangement or configuration.

Figure 1B:
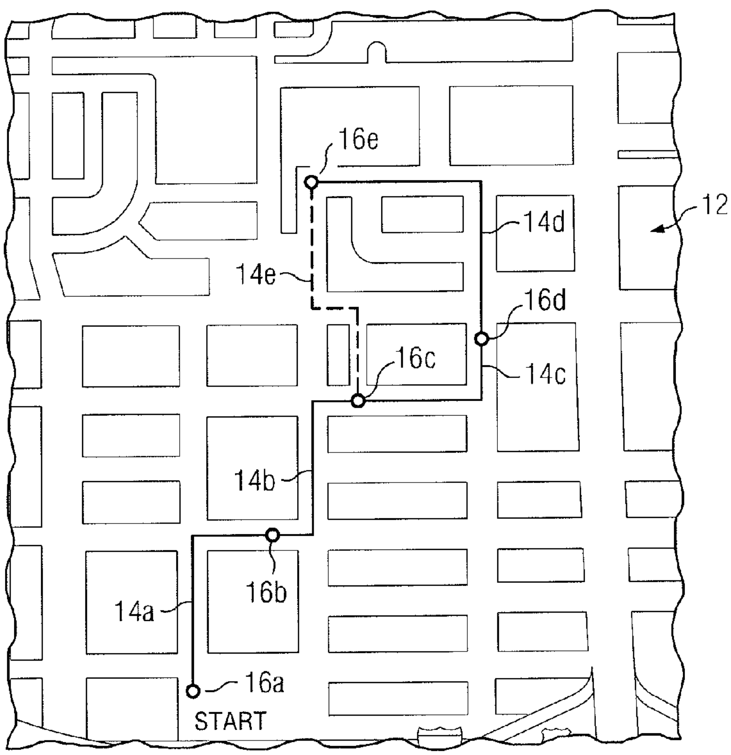

An example operation of vehicle tracking system 10 in accordance with particular embodiments of the present disclosure and with reference to FIGS. 1A and 1B is now described. Operation, in the illustrated example, begins with a driver of vehicle 20 initiating trip 12. Prior to and/or during trip 12, vehicle tracking device 30 may be activated by control device 40. Control device 40 may be operated by an operator of vehicle tracking system 10 and/or an employee/driver of vehicle 20. Control device 40 may communicate with backend controller 50 via networks 60*a* and/or 60*b* to activate tracking device 30, or control device 40 may communicate with tracking device 30 via networks 60*a* and/or 60*b*. For example, in some embodiments control device 40 may transmit a SMS message with one or more instructions to tracking device 30. In some embodiments, control device 40 communicates an Internet Protocol packet to backend controller 50 with instructions to activate vehicle tracking on tracking device 30. Backend controller 50 subsequently activates tracking device 30 by communicating an instruction to tracking device 30 over networks 60*a* and/or 60*b*. Once activated, tracking device 30 may begin determining positional and/or movement information of vehicle 20.

Trip 12 may represent a trip at least part of which an employee/driver undertakes as part of his or her employment. For example, a driver of vehicle 20 may represent an employee of a home healthcare provider that makes visits at patients' homes. At least some portions of trip 12 may be undertaken for personal reasons as well. To illustrate, trip 12 may comprise trip segments 14*a*-14*d*. Trip segments 14 may be defined by stop locations 16*a*-16*e*. Stop locations 16 may include an initial location of vehicle 20 at the beginning of trip 12 and a final location of vehicle 20 at the conclusion of trip 12. In some embodiments, an initial location and final location may represent the same stop location 16. Between an initial location and a final location, a driver of vehicle 20 may stop at one or more additional stop locations 16. A driver of vehicle 20 may stop at stop locations 16 for reasons related to the driver's employment (i.e., business reasons) and/or unrelated to the driver's employment (i.e., personal reasons). Tracking device 30, located in or on vehicle 20, may, at the outset of trip 12, determine and communicate location information 22 of initial stop location 16*a* of vehicle 20 to backend controller 50. Location information 22 may comprise, in particular embodiments, a latitude and longitude of vehicle 20, a speed of vehicle 20, a direction of vehicle 20, a distance traveled by vehicle 20 since a previous stop location 16, a category identifier associated with a particular stop location 16, an odometer reading of vehicle 20 and/or an accumulated distance traveled by vehicle 20 during one or more portions of a particular trip 12. In some embodiments, backend controller uses a first location information 22 including a first odometer reading and a second location information 22 including a second odometer reading to calculated a distance traveled by vehicle 20. Thereafter, as vehicle 20 continues on trip 12, tracking device 30 may determine and communicate location information 22 to backend controller 50 at one or more subsequent times and/or locations. In some embodiments, backend controller may determine a category identifier associated with a particular stop location 16 based on location information 22.

As operation continues, vehicle 20 travels along segment 14*a* and stops at stop location 16*b*. In particular embodiments, tracking device 30 may determine location information 22 as vehicle 20 is traveling along segment 14*a*. As an example, and not by way of limitation, tracking device 30 may determine location information 22 at particular time and/or distance intervals. For example, tracking device 30 may determine location information 22 at two-minute intervals, and/or at one-mile intervals. In some embodiments, tracking device 30 may determine location information 22 once vehicle 20 stops at stop location 16*b*. As mentioned above, tracking device 30 may determine that vehicle 20 is at a particular stop location 16 if vehicle 20 is stationary and/or idle for a predetermined length of time. For example, tracking device 30 may be configured to determine and/or transmit location information 22 to backend controller 50 if and when vehicle 20 remains stationary and/or idle for at least ten minutes. This may allow vehicle tracking system 10 to differentiate between short-interval stops (such as, e.g., a red light) and long-interval stops (such as, e.g., an appointment related to the nature of the particular trip). In some embodiments, tracking device may determine an ignition status of vehicle 20, and transmit location information 22 when an ignition status changes. For example, if an ignition status changes from on to off, tracking device 30 may determine that vehicle 20 is at a stop location 16, and transmit location information to backend controller 50. Similarly, if an ignition status changes from off to on, tracking device 30 may determine that vehicle 20 is initiating a trip 12 and/or segment 14, and transmit location information 22 to backend controller 50. When located at a particular stop location 16, tracking device 30 may transmit location information 22 including a latitude and longitude of vehicle 20, a speed of vehicle 20, a direction of vehicle 20, a direction from a previous stop location 16, a distance traveled by vehicle 20 from a previous stop location 16, a category identifier associated with stop location 16, and/or an accumulated distance traveled by vehicle 20 during one or more portions of a particular trip 12.

Vehicle 20 may remain at stop location 16*b* for any length of time, while the driver/employee of vehicle 20 performs tasks related to the employee's employment. At an appropriate time, vehicle 20 resumes trip 12 by traveling along trip segment 14*b*. As discussed above, tracking device 30 may transmit location information 22 during the vehicle's progress along trip segment 14*b* at predetermined time and/or distance intervals. Vehicle 20 concludes trip segment 14*b* by arriving at stop location 16*c*. Stop location 16*c*, in this example, represents a stop location 16 related to the employee/driver's employment. As with stop location 16*b*, vehicle 20 may transmit location information 22 to backend controller 50 if and when vehicle 20 remains at stop location 16*c* for a predetermined period of time.

Trip 12 resumes after the driver/employee of vehicle 20 performs tasks related to the employee's employment at stop location 16*c*. Vehicle 20 then resumes trip 12 by traveling along trip segment 14*c*. As discussed above, tracking device 30 may transmit location information 22 during the vehicle's progress along trip segment 14*c* at predetermined time and/or distance intervals. Vehicle 20 progresses through trip segment 14*c* and arrives at stop location 16*d*. In this example, stop location 16*d* represents a stop location 16 that is unrelated to the employee/driver's employment. For example, during the course of the employee's workday, the employee may make unscheduled or unauthorized stops, such as a visit to the employee/drivers' bank, a restaurant not located on the employee's regular route, and/or to perform other personal errands. As with stop locations 16*b* and 16*c*, tracking device 30 may transmit location information 22 to backend controller 50 if and when vehicle 20 remains at stop location 16*d* for a predetermined period of time.

Once the driver/employee of vehicle 20 concludes the personal tasks conducted at stop location 16*d*, vehicle 20 resumes trip 12 by traveling along trip segment 14*d*. As discussed above, tracking device 30 may transmit location information 22 during the vehicle's progress along trip segment 14*c* at predetermined time and/or distance intervals. Vehicle 20 concludes trip segment 14*d* and trip 12 by arriving at stop location 16*e*. Stop location 16*e*, in this example, represents a stop location 16 related to the employee/driver's employment. As with stop locations 16*b*, 16*c*, and 16*d*, vehicle 20 may transmit location information 22 to backend controller 50 if and when vehicle 20 remains at stop location 16*e* for a predetermined period of time.

At appropriate points of operation (such as, for example, at the conclusion of trip 12 and/or during trip 12), backend controller 50 may analyze portions of or the entirety of trip 12 by analyzing received location information 22 and generate one or more reports with respect to movement and positional information of trip 12 received from tracking device 30.

In some embodiments, an operator of vehicle tracking system 10 may establish and/or monitor a maintenance schedule associated with one or more particular vehicles 20. For example, backend controller 50 may alert an operator of vehicle tracking system 10 that maintenance associated with a particular vehicle 20 is required. To determine whether maintenance is required, backend controller 50 may determine a number of miles driven by vehicle 20 during one or more particular trips 12. Backend controller 50 may store, for each vehicle 20, a total number of miles driven. When the total number of miles traveled by vehicle 20 reaches a predetermined threshold number of miles, backend controller 50 may alert a user that maintenance of vehicle 20 is required. The threshold number of miles may be configurable by an operator of vehicle tracking system 10, and may be based on the type of maintenance required, the type of vehicle 20, and/or any other relevant considerations.

Vehicle tracking system 10 may provide numerous operational benefits. For example, an operator of vehicle tracking system 10 may advantageously utilize information gathered by vehicle tracking system 10 in various ways. For example, based on a determination of a distance traveled for personal reasons and a distance traveled for business reasons, operators may reimburse an appropriate amount of travel and/or mileage expenses to a driver/employee. Particular embodiments of vehicle tracking system 10 may enable an operator to verify and/or correct a travel expense reimbursement request submitted by a driver/employee. Vehicle tracking system 10 may also enable operators to monitor a vehicle's usage, store a maintenance schedule associated with a vehicle, and alert an operator of a vehicle tracking system when scheduled maintenance is due. Some embodiments my provide some, none, or all of these operational benefits, and may provide additional operational benefits.

Figure 2:
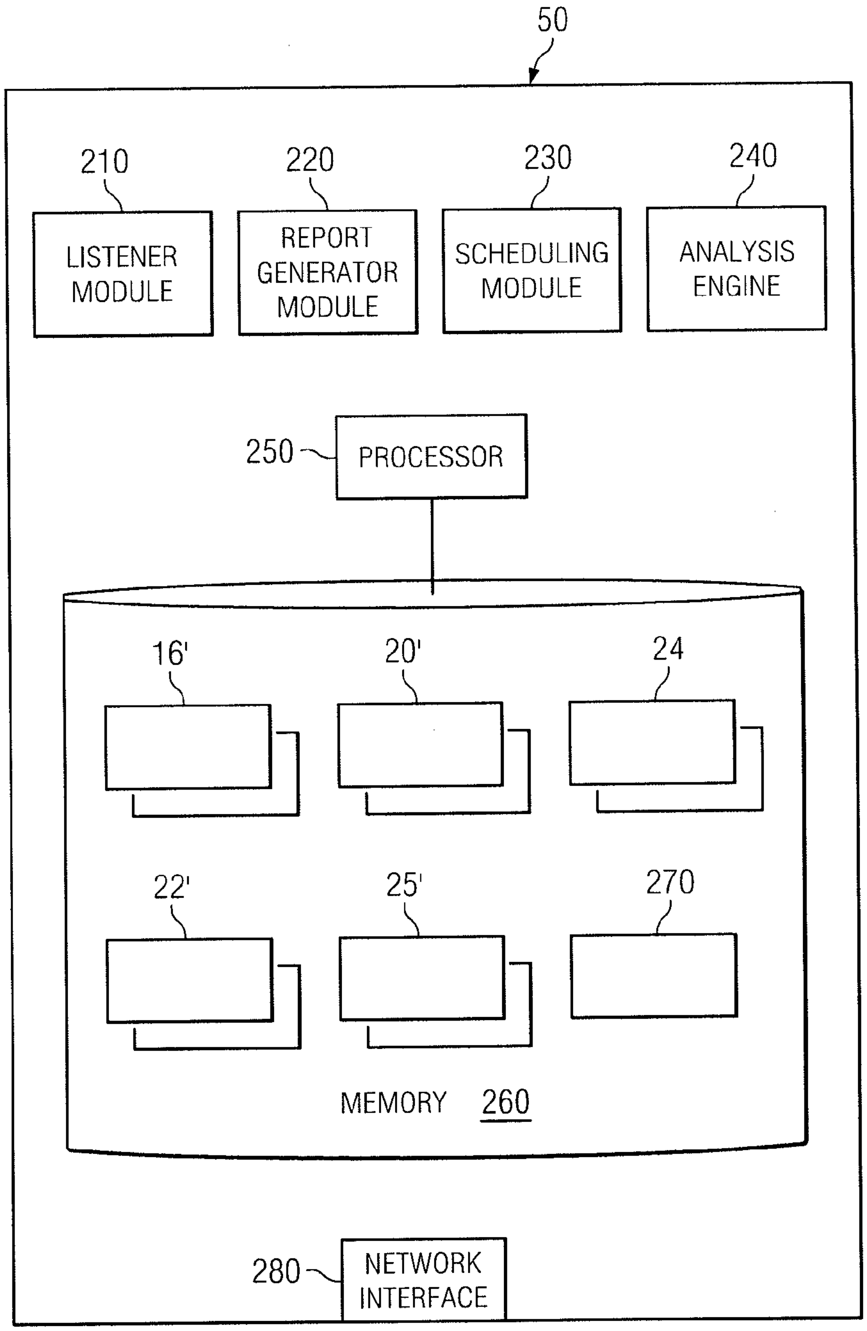
FIG. 2 illustrates the backend controller of FIGS. 1A and 1B in greater detail, in accordance with particular embodiments of the present disclosure.

FIG. 2 is a block diagram illustrating backend controller 50 in more detail, according to particular embodiments of the present disclosure. Backend controller 50 comprises any suitable combination of hardware and/or software implemented in one or more modules to provide the described functions and operations. In some embodiments, backend controller 50 may comprise a general-purpose PC, a Macintosh, a workstation, a Unix-based computer, a server computer, or any suitable processing device. In some embodiments, the functions and operations described above may be performed by a pool of multiple backend controllers 50. As shown in FIG. 2, backend controller 50 includes listener module 210, report generator module 220, scheduling module 230, and analysis engine 240. Backend controller 50 also includes processor 250, memory 260, logic 270, and network interface 280.

Listener module 210 receives information transmitted by tracking device 30 to backend controller 50. In particular embodiments, listener module 210 may receive information, such as, for example, location information 22, through network interface 280. Listener module 210 may parse location information 22 and communicate location information 22 to memory 260. For example, listener module 210 may receive multiple location information 22 from multiple tracking devices 30. Listener module 210 may parse the information received from tracking devices 30 and select location information 22 sent from a particular tracking device 30 for processing.

Report generator module 220 generates reports related to information received from one or more tracking devices 30. Report generator module 220 may generate reports related to a particular vehicle 20 and/or fleet 25. For example, report generator module 220 may generate one or more reports related to one or more vehicle 20's location, distance traveled, time traveled, a start time of a particular trip 12, a stop time of a particular trip 12, odometer reading, number of hours active, number of hours idle, last known and/or current stop location 16, speed, utilization, maintenance history and/or schedule, and/or any other relevant information related to vehicle 20. In general, report generator module 220 may be configured to generate any information relevant to one or more vehicles 20 based on information transmitted by tracking device 30.

Scheduling module 230 may store and generate one or more reports at a predetermined time. For example, an operator may select a particular report to be generated by report generator module 220 at one or more predetermined time periods. As an example, an operator may configure scheduling module 230 to generate a report of a vehicle 20's total number of miles traveled for business-related reasons by a particular vehicle 20 once per week. This report may facilitate the reimbursement of travel expenses to an employee.

Analysis engine 240 performs calculations related to tracking vehicle 20. For example, analysis engine 240 may determine, based on location information 22 and/or other information received from tracking device 30, which portion or portions of a particular trip 12 are related to an employee's employment and which portion or portions are unrelated to an employee's employment. Analysis engine 240 may determine, based on particular stop locations 16 included in a particular trip 12, a length of trip 12. Analysis engine 240 may determine a total amount of time traveled during a particular trip 12, and/or trip segment 14. In general, analysis engine 240 determines any relevant information associated with a particular vehicle 20 and/or trip 12 based on information received from vehicle tracker 30.

Each of listener module 210, report generator module 220, scheduling module 230, and/or analysis module 240 may comprise any appropriate combination of hardware and/or software suitable to perform the described functions. In particular embodiments, listener module 210, report generator module 220, scheduling module 230, and/or analysis module 240 represents logic 270 executing on processor 250.

Memory 260 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as stop location 16', vehicle 20', location information 22', fleet 25', maintenance schedule 24', and/or any other relevant information associated with vehicle tracking system 10. Although FIG. 2 illustrates memory 260 as internal to backend controller 50, it should be understood that memory 260 may be internal or external to backend controller 50, depending on particular implementations. Memory 260 may be separate from or integral to other memory devices to achieve any suitable arrangement of memory devices for use in information vehicle tracking system 10.

Memory 260 is further operable to store logic 270. Logic 270 generally comprises rules, algorithms, code, queries, tables, and/or other suitable instructions for receiving, storing, generating, and/or transmitting information utilized or processed in vehicle tracking system 10.

Memory 260 is communicatively coupled to processor 250. Processor 250 is generally operable to execute logic 270 to determine a location of vehicle 20, a utilization of vehicle 20, a number of miles traveled by vehicle 20, a maintenance schedule associated with vehicle 20, and/or any other information in vehicle tracking system 10 in accordance with particular embodiments described herein. Processor 250 comprises any suitable combination of hardware and software implemented in one or more modules to provide the described function or operation.

Network interface 280 communicates information with networks **60*a* and 60*b*. For example, network interface 280 receives location information from tracking device 30** through network 60*a* and/or 60*b*. As another example, network interface 280 communicates information to begin tracking vehicle or stop tracking vehicle 20 to tracking device 30 networks 60*a* and/or 60*b*. Network interface 280 represents any port or connection, real or virtual, including any suitable hardware and/or software that enables backend controller 50 to exchange information with tracking device 30, control device 40, and/or or other components of vehicle tracking system 10. In particular embodiments, network interface 280 represents an APN interface to a cellular telephony network. Network interface 280 may also represent an Internet Protocol interface to an Internet Service Provider. Although FIG. 2 illustrates an embodiment of backend controller 50 that includes a single network interface 280, particular embodiments may include any appropriate number of network interfaces 280 suitable to perform the described functions. In some embodiments, backend controller 50 may use information associated with stop locations 16 received in location information 22 to store stop locations 16' associated with particular stop locations 16 in memory 260. Each stored stop location 16' may be classified as business, personal, or any other suitable category. For example, backend controller 50 may store a category identifier associated with each stop location 16' that identifies a category associated with a particular stop location 16. Using received location information 22 and/or a category identifier associated with stop locations 16', backend controller 50 may determine an expected distance (d') of a hypothetical trip 12' originating at stop location 16*a* and including trip segments 14*a*, 14*b*, and hypothetical trip segment 14*e*, and ending at stop location 16*e*. Backend controller 50 determines an expected trip by calculating a shortest route from stop location 16*a* to stop location 16*e*, with stops at stop locations 16*b* and 16*c*. Backend controller 50 may also be operable to determine an expected time (t') to complete a hypothetical trip 12' along this course. Thus, backend controller 50 may determine that an actual distance of trip 12 having a distance of d and time t is longer in time and distance than an expected distance of trip 12' having a distance (d') and time (t'), in which vehicle 20 travels from stop location 16*c* to stop location 16*e* along hypothetical trip segment 14*e*'. Thus, based on a length of trip 12 and previous information about stop locations 16 and/or trip 12', backend controller determines that at least one stop location 16 represents a stop location 16 unrelated to an employee's employment. Backend controller 50 may determine that a distance traveled for personal reasons is d−d' (or actual distance minus expected distance) and a time traveled for personal reasons is t−t' (actual time minus expected time). Additionally or alternatively, backend controller 50 may determine that a distance traveled for business reasons is d' and a time traveled for business reasons is t'.

To determine an expected time and/or distance associated with travel from an initial stop location 16 to an ending stop location 16 (such as, for example, trip 12 progressing from stop location 16*a* to stop location 16*e* and including trip segment 14*e*'), backend controller 50 may store information associated with one or more stop locations 16 in memory 260 as stop location 16'. Backend controller 50 may store a keyword, name, or an otherwise human-readable identifier associated with each particular stored stop location 16'. For example, backend controller 50 may store in memory 260 a name, such as "Delivery Stop 1" and location information 22 (such as, for example, a set of latitude and longitude coordinates) of stop location 16*a*'. For stop location 16*b*', backend controller 50 may store a name, such as "Delivery Stop 2" and location information 22 of stop location 16*b*'. As a result, when generating reports associated with vehicle 20, backend controller 50 may report that vehicle 20 stops at stop locations "Delivery Stop 1" and "Delivery Stop 2," in lieu of or in addition to reporting location information 22 (such as the latitude and longitude coordinates) of stop locations 16*a* and 16*b*. Backend controller 50 may additionally or alternatively assign one or more category identifiers to each stored stop location 16', such as for example, a business category or a personal category. Backend controller 50 may store a category identifier associated with each stop location 16' that identifies the particular category associated with a particular stop location. For example, in the case of a home health care provider, backend controller 50 may store in memory 260 location information 22 (such as latitude and longitude information) for each stop location 16 representing a patient home. Backend controller may store a category identifier associated with the stop location 16 representing a patient home that indicates the particular stop location is a business stop location 16 (i.e., related to the employee's employment). As another example, in the case of a delivery vehicle, backend controller 50 may store in memory 260 location information 22 (such as latitude and longitude information) associated with each stop location 16 representing a delivery location. Backend controller may store a category identifier associated with the stop location 16 representing a delivery location that indicates the particular stop location 16 is a business stop location 16 (i.e., related to the employee's employment). Additionally or alternatively, backend controller 50 may store location information 22 for stop locations 16 associated with an employee's personal tasks. For example, an employee may travel to a specific bank each Friday to deposit a paycheck. Backend controller 50 may store location information 22 associated with the particular stop location 16 representing the bank, and/or any other locations associated with an employee's personal tasks. Backend controller may store a category identifier associated with the particular stop location 16 representing the bank that indicates that stop location 16 is a personal stop location 16 (i.e., unrelated to the employee's employment).

As a result, backend controller 50 may determine whether an employee is at a stop location 16 that is related or unrelated to the employee's employment by comparing location information 22 of a particular stop location 16 received from tracking device 30 with location information 22 associated with each stored stop location 16'. For example, an employee stops at stop location 16*b*, representing a patient's home, and transmits location information 22 to backend controller 50. Backend controller 50 compares the received location information 22 with stored location information 22 for one or more stop locations 16'. Based on the proximity of latitude and longitude information associated with stop location 16*b* and stored latitude and longitude information associated with stop location 16', backend controller 50 determines that stop location 16*b* is a particular stop location 16'previously stored in memory, retrieves the category identifier associated with stop location 16', and determines that stop location 16*b* is related to the employee's employment (and not related to an employee's personal tasks). Additionally or alternatively, a driver may be able to transmit category information associated with a particular stop location 16 to backend controller 50. For example, at a particular stop location 16, an employee may be able to use control device 40 to select an option for business, personal, and/or any other relevant category. Control device 40 may transmit location information 22 associated with vehicle 20's current stop location 16, and category information entered by driver. Upon receiving latitude and longitude information and category information, backend controller 50 may store stop location 16', representing the location of vehicle 20, and store a category identifier associated with stop location 16', based on the driver's input. As a result, if backend controller 50 has no stop location 16' information associated with a particular stop location 16 (e.g., if the particular stop location 16 has not been previously visited), backend controller 50 may obtain category information for stop location 16 from an employee utilizing control device 40.

Figure 3:
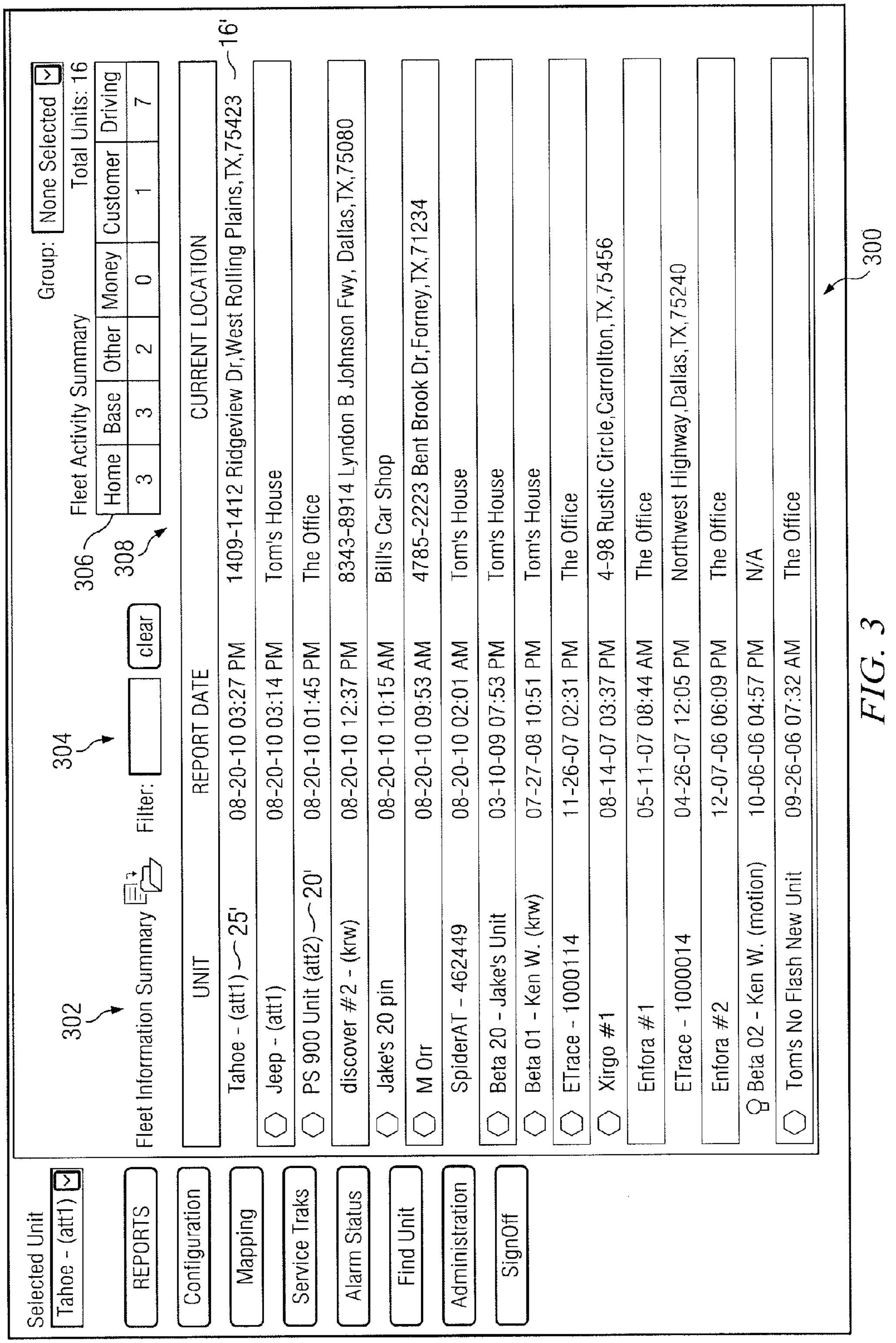
FIG. 3 illustrates a graphical user interface utilized in the vehicle tracking system of FIGS. 1A and 1B, in accordance with particular embodiments of the present disclosure.

FIG. 3 illustrates GUI 300 displayed by backend controller 50. GUI 300 may be displayed on a display associated with backend controller 50, on control device 40, and/or any other component of vehicle tracking system 10. As shown in FIG. 3, GUI 300 may display a fleet information summary, which includes information associated with a particular fleet 25. Fleet 25 includes vehicles 20, shown in column 302 of GUI 300. For each vehicle 20, GUI 300 may display a report date in column 304 (indicating a time that tracking device 30 last transmitted location information 22 to backend controller 50), and a current location in column 308 (indicating a stop location 16 at which vehicle tracker 30 last transmitted location information 22 to backend controller 50). In particular embodiments, a user may select a particular vehicle 20 to retrieve more information associated with the selected vehicle 20. GUI 300 may also display a number of vehicles 20 in fleet 25 belonging to each of one or more category identifiers in row 306.

Figure 4:
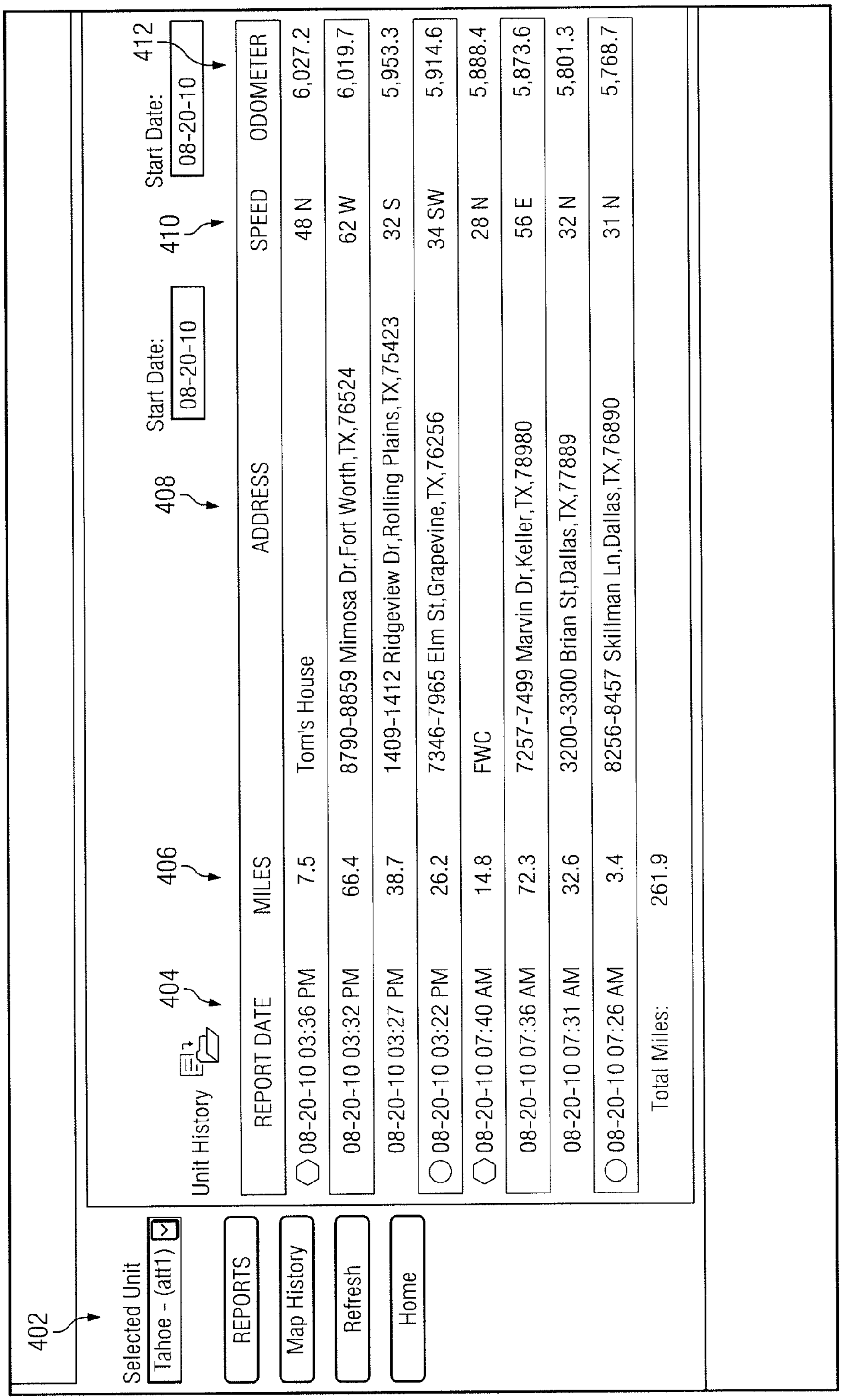
FIG. 4 illustrates a graphical user interface utilized in the vehicle tracking system of FIGS. 1A and 1B, in accordance with particular embodiments of the present disclosure.

FIG. 4 illustrates a GUI 400 displayed by backend controller 50. GUI 400 may be displayed on a display associated with backend controller 50, on control device 40, and/or any other component of vehicle tracking system 10. As shown in FIG. 4, GUI 400 may display a history for a particular vehicle 20 shown in box 402, which may include one or more stop locations 16 associated with one or more trips 12 taken by the particular vehicle 20. GUI 400 includes, for each stop location 16, a report date in column 404 (indicating a time that vehicle tracker 30 last transmitted location information 22 to backend controller 50), miles traveled in column 406 (indicated the number of miles traveled from a previous stop location 16 in the list to the indicated stop location 16 in the list), a name identifier associated with the indicated stop location 16 in column 408, an average speed and/or direction traveled to arrive at the indicated stop location 16 in column 410, and an odometer reading of vehicle 20 at the indicated stop location 16 in column 412. In some embodiments, selecting the name identifier associated with the indicated stop location 16 may display a user input window, which allows a user to define a name and/or location of the indicated stop location 16 and select a category associated with the indicated stop location 16 (such as, for example, a business or personal stop location 16).

Figure 5:
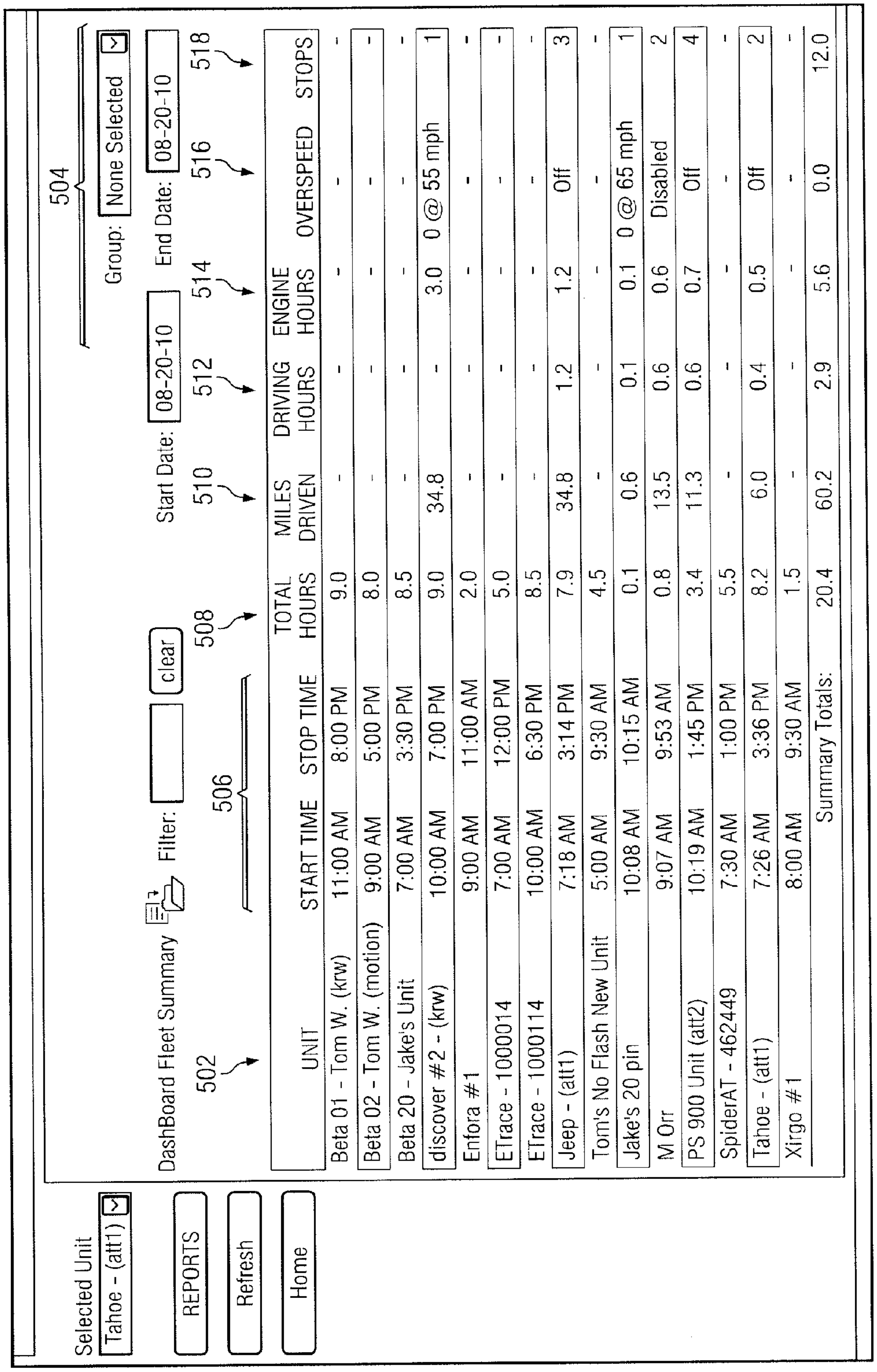
FIG. 5 illustrates a graphical user interface utilized in the vehicle tracking system of FIGS. 1A and 1B, in accordance with particular embodiments of the present disclosure.

FIG. 5 illustrates a graphical user interface GUI 500 displayed by backend controller 50. GUI 500 may be displayed on a display associated with backend controller 50, on control device 40, and/or any other component of vehicle tracking system 10. As shown in FIG. 5, GUI 500 may display a dashboard fleet summary associated with a particular fleet 25. Fleet 25 includes vehicles 20, shown in column 502 of GUI 500. A dashboard fleet summary may display for each vehicle 20 in a particular fleet 25 information associated with each vehicle over a given period of time. A user may enter a time range in time range input 504. For the entered time range, GUI 500 may display, for each vehicle 20, a start time and stop time associated with one or more trips 12 in column 506, a total number of hours traveled during the selected time range in column 508, a number of miles driven during the selected time range in column 510, a total number of hours spent driving during the selected time range in column 512, a total number of hours for which an engine of vehicle 20 was running in column 514, the number of times a vehicle 20 exceeded a posted speed limit in column 516, and the number of stop locations 16 included in the selected time range in column 518.

Figure 6:
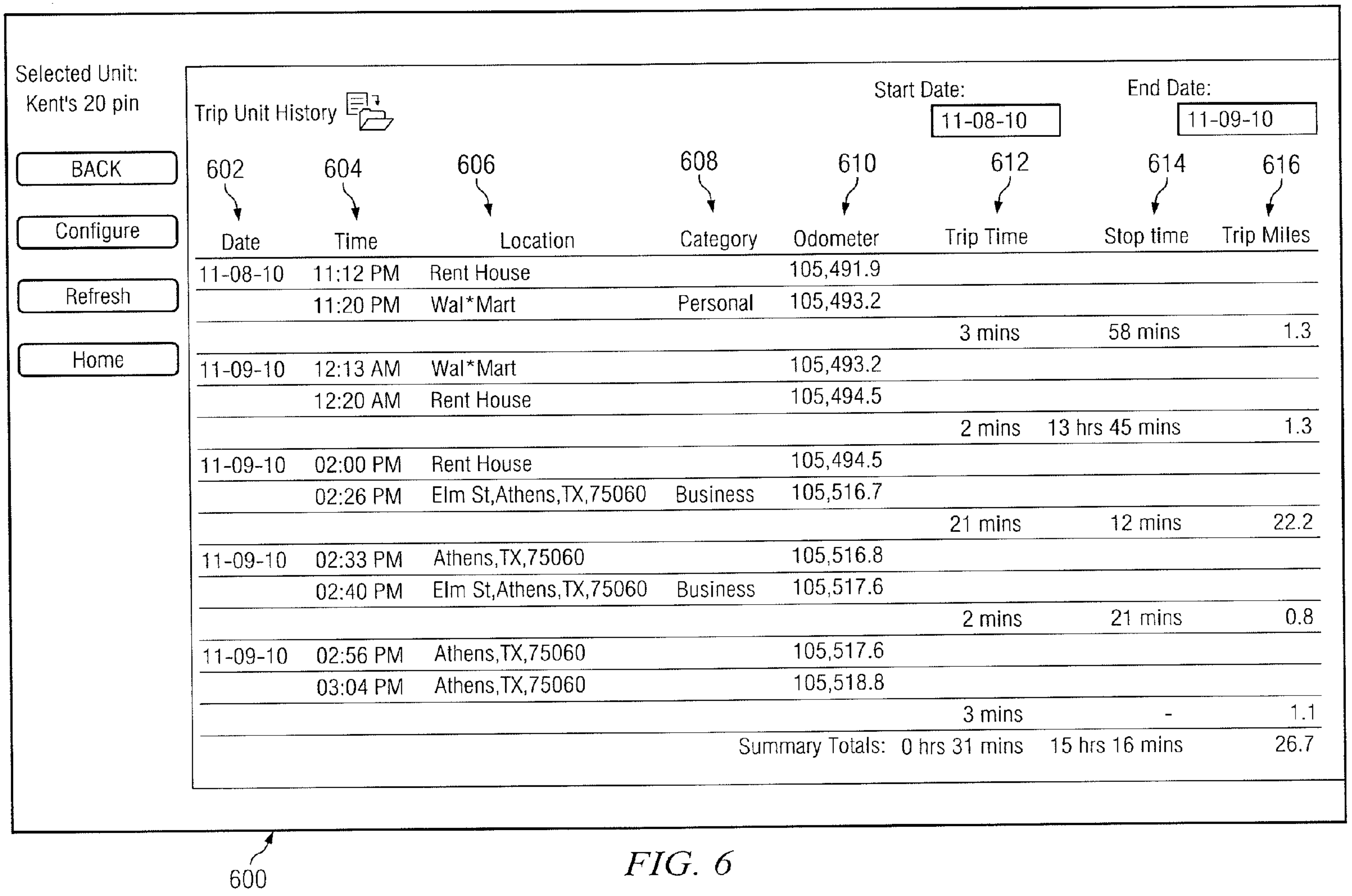
FIG. 6 illustrates a graphical user interface utilized in the vehicle tracking system of FIGS. 1A and 1B, in accordance with particular embodiments of the present disclosure.

FIG. 6 illustrates a graphical user interface GUI 600 displayed by backend controller 50. GUI 600 may be displayed on a display associated with backend controller 50, on control device 40, and/or any other component of vehicle tracking system 10. As shown in FIG. 6, GUI 600 may display a trip unit history associated with a particular vehicle 20 and/or trip 12. A trip unit history may display one or more stop locations 16 associated with segments 14 included in a particular trip 12 in column 606. A particular stop location 16 may be displayed as an address, a name associated with stop location 16, and/or latitude and longitude coordinates associated with stop location 16. GUI 600 may also display a date a particular vehicle 20 traveled on the segment 14 indicated by the stop locations 16 in column 602. In column 604, GUI 600 may display the time at which vehicle 20 stopped at and/or left from the particular stop location 16. In column 608, GUI 600 may display a category identifier associated with a particular stop location 16. An odometer reading of vehicle 20 at stop location 16 may be displayed in column 610. GUI 600 may display a time elapsed while vehicle was traveling between particular stop locations in column 612. In column 614, GUI 600 may display an amount of time vehicle 20 was stopped at a particular stop location 16. In column 616, GUI 600 may display number of miles traveled between particular stop locations 16. In particular embodiments, GUI 600 may display summary totals for relevant figures.

Figure 7:
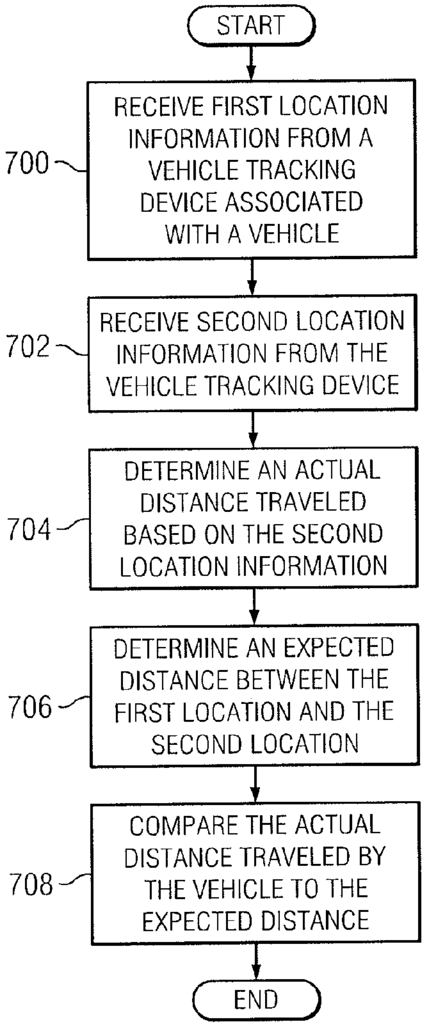
FIG. 7 is a flow diagram illustrating operation of the vehicle tracking system of FIGS. 1A and 1B according to particular embodiments of the present disclosure.

FIG. 7 is a flow diagram illustrating a method for vehicle tracking and reporting in accordance with particular embodiments of the present disclosure. Operation begins at step 700, in which first location information 22 is received from a tracking device 30 associated with vehicle 20, the first location information 22 indicating a location of vehicle 20 at a first location. First location information 22 is associated with a particular stop location 16. First location information 22 may indicate latitude and longitude coordinates of the particular stop location 16, a distance traveled from a previous stop location 16, a speed traveled to the stop location 16, and/or any other information related to vehicle 20 and/or stop location 16. First location information 22 may be associated with an initial stop location 16 and/or any other stop location 16 included in a particular trip 12. First location information 22 may be received from vehicle tracking device 30 associated with a particular vehicle 20 undertaking one or more trips 12.

Operation continues at step 702 in which second location information 22 is received from the vehicle tracking device, the second location information 22 indicating a location of the vehicle at a second location and a distance traveled by the vehicle from the first location. Second location information 22 may be associated with a second stop location 16. In some embodiments, the first location (a first stop location 16) and the second location (a second stop location 16) represent the same location (i.e., vehicle travels for a particular distance and returns to the same stop location 16). In some embodiments, the first location (a first stop location 16) and the second location (a second stop location 16) represent different stop locations 16. Second location information 22 may indicate latitude and longitude coordinates of the second stop location 16, a distance traveled from a previous stop location 16, a speed traveled to the stop location 16, and/or any other information related to vehicle 20 and/or stop location 16. In some embodiments, a second location may represent the next stop location 16 immediately after a first location. In some embodiments, vehicle 20 may stop at one or more additional stop locations 16 after a first location and prior to second location. As a result, first location information 22, first location, second location information 22 and/or a second location may not necessarily refer to a particular order in which stop locations 16 are visited by vehicle 20.

At step 704, an actual distance traveled by the vehicle from the first location to the second location is determined based on the second location information 22. As discussed above, second location information 22 may indicate a distance traveled from one or more previous stop locations 16.

At step 706, an expected distance between the first location and the second location is determined, based on the first location information 22 and the second location information 22. In particular embodiments, backend controller 50 uses first location information 22 and second location information 22 to determine an expected distance between a first stop location 16 and a second stop location 16. In particular embodiments, backend controller 50 may use a map database to determine a shortest route from a first stop location 16 to a second stop location 16. A shortest route may be based on a shortest distance, a shortest time, or any other relevant factors or considerations. Moreover, backend controller 50 may determine an expected distance by including a distance from a first stop location 16 to one or more additional stop locations 16, and from one or more additional stop locations 16 to a second stop location 16.

At step 708, the actual distance traveled by vehicle 20 is compared to the expected distance. In some embodiments, backend controller 50 compares the actual distance traveled by vehicle 20 to the expected distance by subtracting the expected distance from the actual distance. For example, if an expected distance is twenty miles, and the actual distance is twenty-five miles, backend controller 50 may subtract the expected distance (20) from then actual distance (25), or 25 minus 20. As a result, backend controller 50 may determine that vehicle 20 traveled five more miles than expected (such as, for example, due to an employee/driver's unauthorized detour for personal reasons). Backend controller 50 may use an actual distance and an expected distance to determine a compensation amount. For example, in the example above, if an employee reports that he or she traveled twenty-five miles, an operator may use a report generated by backend controller 50 to show that the employee traveled five more miles than expected, and calculate a compensation amount based on a travel distance of twenty miles, rather than the self-reported twenty-five miles.

Some of the steps illustrated in FIG. 7 may be combined, modified, or deleted where appropriate, and additional steps may also be added to the flowchart. Additionally, steps may be performed in any suitable order without departing from the scope of the disclosure.

Figure 8:
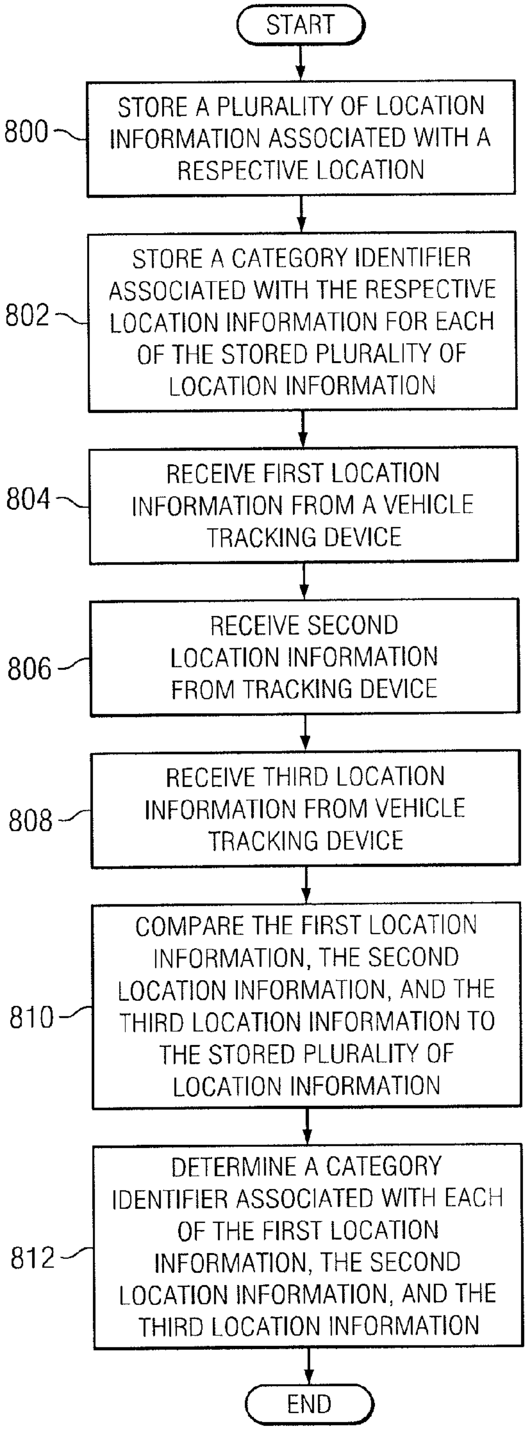
FIG. 8 is a flow diagram illustrating operation of the vehicle tracking system of FIGS. 1A and 1B according to particular embodiments of the present disclosure.

FIG. 8 is a flow diagram illustrating a method for vehicle tracking and reporting in accordance with particular embodiments of the present disclosure. Operation begins in step 800 with a plurality of location information associated with a respective location being stored in a memory 260. In some embodiments of vehicle tracking system 10, location information 22 may be stored for each of a predetermined number of locations. For example, for each of a predetermined number of locations, backend controller 50 may store latitude and longitude coordinates associated with the respective location. In this way, backend controller 50 may store a database of locations (such as, for example, one or more stop locations 16) and associated location information. Location information 22' and/or the locations may be entered by an operator of vehicle tracking system 10 and/or stored in memory 260 as location information is received from vehicle tracking device 30.

At step 802, a category identifier associated with the respective location information 22' is stored for each of the stored plurality of location information 22'. In some embodiments, a category identifier associated with a particular stop location 16 and may be stored in memory 260. A category identifier may include one or more relevant characteristics of a particular stop location 16. For example, a category identifier associated with stop location 16 may include business, personal, and/or customer.

At step 804, first location information 22 is received from tracking device 30 associated with vehicle 20, the first location information 22 indicating a location of vehicle 20 at a first location. First location information 22 may be received from tracking device 30 during or after vehicle 20 stops at a particular stop location 16. First location information 22 may also be stored in tracking device 30 and transmitted to backend controller 50 at a subsequent time.

At step 806, second location information 22 is received from tracking device 30, the second location information 22 indicating a location of vehicle 20 at a second location. Once vehicle 20 leaves a first stop location 16, vehicle 20 may travel to a second stop location 16. Vehicle 20 may travel directly from a first stop location 16 to a second stop location 16, or may travel to one or more additional stop locations 16 between a first stop location 16 and a second stop location 16. In some embodiments a first stop location 16 and a second stop location 16 represent the same stop location 16.

At step 808, third location information 22 is received from tracking device 30, the third location information 22 indicating a location of vehicle 20 at a third location. Once vehicle 20 leaves a second stop location 16, vehicle 20 may travel to a third stop location 16. Vehicle 20 may travel directly from a second stop location 16 to a third stop location 16, or may travel to one or more additional stop locations 16 between a second stop location 16 and a third stop location 16.

At step 810, the first location information 22, the second location information 22, and the third location information 22 are compared to the stored plurality of location information 22'. Backend controller 50 may compare each of the received location information 22 to the location information 22' stored in step 800. For example, backend controller 50 compares first location information 22 to one or more stored location information 22' to determine if backend controller 50 has previously stored information associated with a first stop location 16. Backend controller 50 may compare latitude and longitude coordinates included in first location information 22 to latitude and longitude coordinates included in one or more stored location information 22' to determine if one more stored location information 22' is similar to received location information 22. An operator of vehicle tracking system 10 may determine a threshold for which stored location information latitude and longitude coordinates and first location information latitude and longitude coordinates are similar. For example, an operator may configure backend controller 50 to determine that if stored location information latitude and longitude coordinates are within one arc second of degree (and/or any other such suitable parameter) of received first location information latitude and longitude coordinates, then the latitude and longitude coordinates are similar.

At step 812, a category identifier associated with each of the first location information 22, the second location information 22, and the third location information 22 is determined, based on the comparison performed in step 810. Once backend controller 50 identifies, for example, a stored location information 22' similar to first location information 22, backend controller 50 may determine a category identifier associated with the identified stored location information 22'. In this way, backend controller 50 is able to determine a category identifier associated with a first stop location 16. Using the category identifier (such as, for example, "business" or "personal"), backend controller 50 is able to determine a characteristic of a particular stop location 16. For example, in some embodiments, backend controller 50 determines whether vehicle 20 stopped at stop location 16 for business reasons or personal reasons. Additionally or alternatively, backend controller 50 may use category identifiers to determine a compensation amount for a trip 12 that includes a first stop location 16, second stop location 16, and a third stop location 16.

Some of the steps illustrated in FIG. 8 may be combined, modified, or deleted where appropriate, and additional steps may also be added to the flowchart. Additionally, steps may be performed in any suitable order without departing from the scope of the disclosure.

Numerous other changes, substitutions, variations, alterations, and modifications may be ascertained by those skilled in the art as intended that the present disclosure encompass all such changes, substitutions, variations, alterations, and modifications as falling within the spirit and scope of the present disclosure and appended claims.

What is claimed is:

1. A method, comprising:

receiving first location information from a first vehicle tracking device associated with a first vehicle, the first location information indicating a first location of the first vehicle, the first location determined by the first vehicle tracking device based on the first vehicle being stationary for a first predetermined amount of time;

determining, with a control processor, based on the first location information, a first category identifier associated with the first location;

receiving second location information from the first vehicle tracking device, the second location information indicating a second location of the first vehicle, the second location determined by the first vehicle tracking device based on the first vehicle being stationary for a second predetermined amount of time;

determining, with the control processor, based on the second location information, a second category identifier associated with the second location;

receiving third location information from the first vehicle tracking device, the third location information indicating a third location of the first vehicle, the third location determined by the first vehicle tracking device based on the first vehicle being stationary for a third predetermined amount of time;

determining, with the control processor, based on the third location information, a third category identifier associated with the third location;

determining, with the control processor, based on the first location information, the second location information, and the third location information, an actual distance traveled by the first vehicle from the first location to the second location, wherein determining the actual distance traveled by the first vehicle from the first location to the second location comprises determining a distance traveled by the first vehicle from the first location to the third location and a distance traveled from the third location to the second location;

determining, with the control processor, based on the first location information, the second location information, and the third category identifier, an expected distance between the first location and the second location, wherein determining the expected distance comprises determining a distance from the first location to the second location that excludes a distance from the first location to the third location and a distance from the third location to the second location based on the third category identifier;

wherein the first, second, and third category identifiers are determined by the control processor based on:

one or more fourth category identifiers associated with one or more of the first, second, and third locations received from one or more second vehicle tracking devices associated with one or more second vehicles; and one or more fourth locations representing predicted stop locations associated with the first vehicle tracking device.

2. The method of claim 1, further comprising comparing, with the control processor, the actual distance traveled by the first vehicle to the expected distance.

3. The method of claim 1, wherein the expected distance of the trip comprises a shortest route from the first location to the second location.

4. The method of claim 1, wherein determining an expected distance between the first location and the second location comprises determining a shortest route from the first location to the second location.

5. The method of claim 1, further comprising initiating, with a control device, vehicle tracking with the first vehicle tracking device.

6. The method of claim 2, further comprising based on the comparison of the actual distance traveled by the first vehicle to the expected distance, determining a compensation amount for the travel from the first location to the second location.

7. The method of claim 1, further comprising determining a maintenance schedule associated with the first vehicle, based at least in part on the actual distance traveled by the first vehicle from the first location to the second location.

8. The method of claim 1, further comprising generating, based at least in part on the first location information and the second location information, a report indicating the actual distance traveled and the expected distance traveled by the first vehicle.

9. A system comprising:

a first vehicle tracking device operable to:

transmit first location information indicating at least a location of a first vehicle at a first location, the first location determined by the first vehicle tracking device based on the first vehicle being stationary for a first predetermined amount of time;

transmit second location information indicating at least a location of the first vehicle at a second location, the second location determined by the first vehicle tracking device based on the first vehicle being stationary for a second predetermined amount of time; and transmit third location information indicating at least a location of the first vehicle at a third location, the third location determined by the first vehicle tracking device based on the first vehicle being stationary for a third predetermined amount of time; and a processor operable to:

receive the first location information, the second location information, and the third location information;

determine, based on the first location information, a first category identifier associated with the first location;

determine, based on the second location information, a second category identifier associated with the second location;

determine, based on the third location information, a third category identifier associated with the third location;

determine based on the first location information, the second location information, and the third location information, an actual distance traveled by the first vehicle from the first location to the second location, wherein determining the actual distance traveled by the first vehicle from the first location to the second location comprises determining a distance traveled by the first vehicle from the first location to the third location and a distance traveled from the third location to the second location; and determine, based on the first location information, the second location information, and the third category identifier, an expected distance between the first location and the second location, wherein determining the expected distance comprises determining a distance from the first location to the second location that excludes a distance from the first location to the third location and a distance from the third location to the second location based on the third category identifier;

wherein the first, second, and third category identifiers are determined by the control processor based on:

one or more fourth category identifiers associated with one or more of the first, second, and third locations received from one or more second vehicle tracking devices associated with one or more second vehicles; and one or more fourth locations representing predicted stop locations associated with the first vehicle tracking device.

10. The system of claim 9, wherein the control processor is further operable to compare the actual distance traveled by the first vehicle to the expected distance.

11. The system of claim 9, wherein the expected distance of the trip comprises a shortest route from the first location to the second location.

12. The system of claim 9, wherein the processor is operable to determine an expected distance between the first location and the second location by determining a shortest route from the first location to the second location.

13. The system of claim 9, further comprising a control device operable to initiate vehicle tracking with the first vehicle tracking device.

14. The system of claim 10, wherein the processor is further operable to determine, based on the comparison of the actual distance traveled by the first vehicle to the expected distance, a compensation amount for the travel from the first location to the second location.

15. The system of claim 9, wherein the processor is further operable to determine, based at least in part on the actual distance traveled by the first vehicle from the first location to the second location, a maintenance schedule associated with the first vehicle.

16. The system of claim 9, wherein the processor is further operable to generate, based at least in part on the first location information and the second location information, a report indicating the actual distance traveled and the expected distance traveled by the first vehicle.

17. A non-transitory computer-readable storage medium encoded with logic, the logic operable, when executed on a processor, to:

receive first location information from a first vehicle tracking device associated with a first vehicle, the first location information indicating a first location of the first vehicle, the first location determined by the first vehicle tracking device based on the first vehicle being stationary for a first predetermined amount of time;

determine, based on the first location information, a first category identifier associated with the first location;

receive second location information from the first vehicle tracking device, the second location information indicating a second location of the first vehicle, the second location determined by the first vehicle tracking device based on the first vehicle being stationary for a second predetermined amount of time;

determine, based on the second location information, a second category identifier associated with the second location;

receive third location information from the first vehicle tracking device, the third location information indicating a third location of the first vehicle, the third location determined by the first vehicle tracking device based on the first vehicle being stationary for a third predetermined amount of time;

determine, based on the third location information, a third category identifier associated with the third location;

determine based on the first location information, the second location information, and the third location information, an actual distance traveled by the first vehicle from the first location to the second location, wherein determining the actual distance traveled by the first vehicle from the first location to the second location comprises determining a distance traveled by the first vehicle from the first location to the third location and a distance traveled from the third location to the second location; and determine, based on the first location information, the second location information, and the third category identifier, an expected distance between the first location and the second location, wherein determining the expected distance comprises determining a distance from the first location to the second location that excludes a distance from the first location to the third location and a distance from the third location to the second location based on the third category identifier;

wherein the first, second, and third category identifiers are determined by the control processor based on:

one or more fourth category identifiers associated with one or more of the first, second, and third locations received from one or more second vehicle tracking devices associated with the one or more second vehicles; and one or more fourth locations representing predicted stop locations associated with the first vehicle tracking device.

18. The non-transitory computer-readable storage medium of claim 17, wherein the logic is further operable to compare the actual distance traveled by the first vehicle to the expected distance.

19. The non-transitory computer-readable storage medium of claim 17, wherein the expected distance of the trip comprises a shortest route from the first location to the second location.

20. The non-transitory computer-readable storage medium of claim 17, wherein the logic is operable to determine an expected distance between the first location and the second location by determining a shortest route from the first location to the second location.

21. The non-transitory computer-readable storage medium of claim 17, wherein the logic is further operable to receive, from a control device, an instruction initiating vehicle track with the first vehicle tracking device.

22. The non-transitory computer-readable storage medium of claim 18, wherein the logic is further operable to determine, based on the comparison of the actual distance traveled by the first vehicle to the expected distance, a compensation amount for the travel from the first location to the second location.

23. The non-transitory computer-readable storage medium of claim 17, wherein the logic is further operable to determine, based at least in part on the actual distance traveled by the first vehicle from the first location to the second location, a maintenance schedule associated with the first vehicle.

24. The non-transitory computer-readable storage medium of claim 17, wherein the logic is further operable to generate, based at least in part on the first location information and the second location information, a report indicating the actual distance traveled and the expected distance traveled by the first vehicle.

* * * * *